(12) United States Patent
Rozoy

(10) Patent No.: US 11,618,869 B2
(45) Date of Patent: Apr. 4, 2023

(54) AROMATIZED EFFERVESCENT WINE AND METHOD OF MAKING SAME

(71) Applicant: Clément Rozoy, Montpellier (FR)

(72) Inventor: Clément Rozoy, Montpellier (FR)

(73) Assignee: Clément Rozoy, Montpellier (FR)

( * ) Notice: Subject to any disclaimer, the term of this patent is extended or adjusted under 35 U.S.C. 154(b) by 939 days.

(21) Appl. No.: 16/379,491

(22) Filed: Apr. 9, 2019

(65) Prior Publication Data

US 2019/0367853 A1 Dec. 5, 2019

(51) Int. Cl.
*C12G 1/06* (2019.01)

(52) U.S. Cl.
CPC ........................................ *C12G 1/06* (2013.01)

(58) Field of Classification Search
CPC ....................................................... C12G 1/06
See application file for complete search history.

(56) References Cited

U.S. PATENT DOCUMENTS

| | | | | |
|---|---|---|---|---|
| 2009/0181123 A1* | 7/2009 | La Caze | ................... | C12P 1/02 |
| | | | | 435/254.2 |
| 2016/0073673 A1* | 3/2016 | Schuh | ...................... | A23L 2/60 |
| | | | | 426/534 |

FOREIGN PATENT DOCUMENTS

| CN | 102061246 | * | 5/2011 |
|---|---|---|---|
| CN | 102102063 | * | 6/2011 |
| CN | 102864063 | * | 1/2013 |
| CN | 107557204 | * | 1/2018 |
| SU | 1761103 | * | 9/1992 |

OTHER PUBLICATIONS

Wilkowska et al. Food Chemistry. 2017. vol. 237. pp. 282-289.*

* cited by examiner

*Primary Examiner* — Anthony J Weier
(74) *Attorney, Agent, or Firm* — Hauptman Ham, LLP

(57) ABSTRACT

The invention relates to an effervescent wine obtained according to a vinification of the traditional type, comprising a mixture of at least 20 terpenes added to said wine, wherein the terpenes are chosen from monoterpenes, in a quantity within the range of 50% by weight to 75% by weight, sesquiterpenes, in a quantity within the range of 25% by weight to 50% by weight, the sum being equal to 100% by weight, the quantity in said mixture of terpenes in the wine being between 0.02 ml and 0.6 ml per litre of effervescent wine. The invention also relates to a traditional method of vinification of an effervescent wine comprising a step of adding an expedition liqueur comprising the mixture of terpenes.

12 Claims, 1 Drawing Sheet

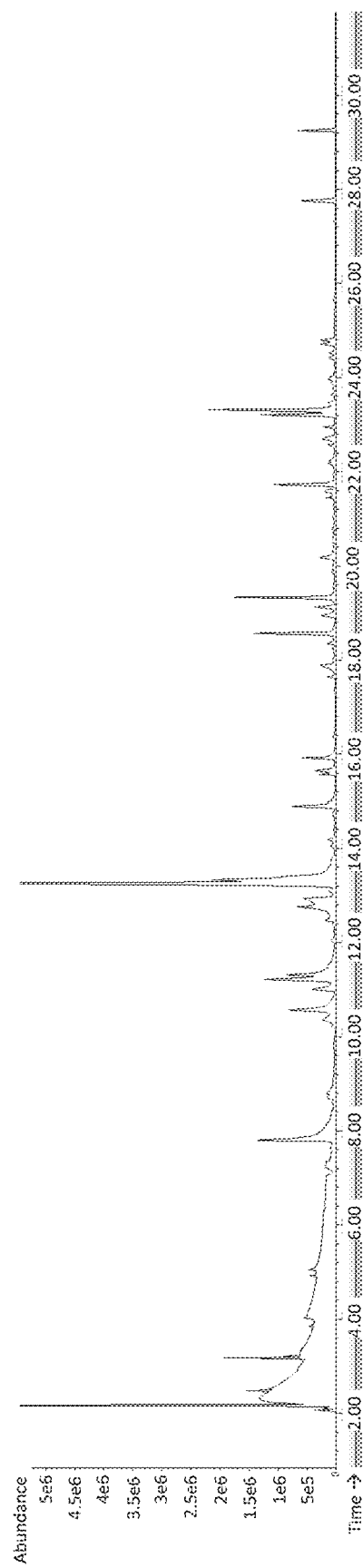

AROMATIZED EFFERVESCENT WINE AND METHOD OF MAKING SAME

TECHNICAL FIELD

This invention relates to the field of aromatised wines, in particular, effervescent wines aromatised with terpenes.

BACKGROUND

Wine is the product coming from the alcoholic fermentation and the maceration more or less long of fresh grapes. Wine contains more than 100 constituents, with the two main constituents being water and alcohol. It is very interesting to know a portion of the other 98 when tasting is of interest. In addition to sugars, such as glucose and fructose, organic and inorganic acids, such as tartaric and sulphuric acids, and polyphenols, many chemical compounds, naturally present in wine, provide the various types of wines with many odorous, aromatised and gustative qualities.

SUMMARY

Provided are effervescent wines obtained according to a vinification of the traditional type, comprising a mixture of at least 20 terpenes added to said wine, wherein the terpenes are chosen from monoterpenes, in a quantity within the range of 50% by weight to 75% by weight, sesquiterpenes, in a quantity within the range of 25% by weight to 50% by weight, the sum being equal to 100% by weight, the quantity in said mixture of terpenes in the wine being between 0.02 ml and 0.6 ml per litre of effervescent wine.

Also provided are methods for the traditional vinification of an effervescent wine comprising the following steps of vinification of grapes into still wines, of elaborating the cuvée, of adding a drawing liquor, of a second fermentation, of riddling and disgorging, characterised in that it comprises, after the step of disgorging, a step of adding an expedition liqueur comprising the mixture of terpenes, wherein the terpenes are chosen from monoterpenes, in a quantity within the range of 50% by weight to 75% by weight, sesquiterpenes, in a quantity within the range of 25% by weight to 50% by weight, the sum being equal to 100% by weight, the quantity in said mixture of terpenes in the wine being between 0.02 ml and 0.6 ml per litre of effervescent wine.

BRIEF DESCRIPTION OF THE FIGURES

FIG. 1 shows a chromatogram obtained via gas chromatography combined with a analyse via mass spectrometry of a sample of sparkling wine with a base of Chardonnay varieties, obtained by a traditional vinification developed hereinabove, containing a mixture of at least 20 terpenes.

DETAILED DESCRIPTION

The aromatic substances are located in the hypodermic cells of the skin of the grapes. The quantity is very low, but their aromatic power can be substantial. The so-called "primary" flavourings are present in the grape (their concentration increases until maturity, then they become heaver, less refined), the so-called "secondary" flavourings are formed during the alcoholic fermentation, for example the flavourings due to higher alcohols, aldehydes, ketones and ethyl or amyl esters, the organic acids present in the fermentation, and the so-called "tertiary" flavourings appearing during the ageing of the wine and which are generated during slow esterifications between the organic acids of the wine and the alcohol, condensations and spontaneous syntheses between alcoholic, aldehydic, ketonic and phenolic functions. Like tannins, flavourings play a central role in wines. When they are in bonded form, they are called flavour precursors, they are not odorous. These are specific enzymes that allow for the release of flavourings. Certain strains of yeasts allow for the release of specific flavourings, such as present in wine of beaujolais nouveau type.

The aromatic substances are comprised in particular of terpenes, carotenoids, cysteinyl compounds and pyrazines. They can be in bonded or free form. Certain terpenes, such as geraniol, citronellol, nerol, linalol, increase during the maturation then decrease afterwards. During maturation, the content in carotenoids decreases. Carotenoids, which do not give flavourings, are transformed into norisoprenoids which are odorous, for example, β-ionone and damascenone. Pyrazines, such as 3-isobutyl-2-methoxypyrazine (IBMP), decrease during maturation, very rapidly after ripening. They are responsible for the green pepper flavourings encountered in the varieties, in particular cabernet sauvignon, cabernet franc, sauvignon blanc and merlot. The cysteinyl derivatives are the precursors of volatile thiols obtained by the action of the yeast during the alcoholic fermentation and this in a variable manner according to the strain and the species of yeast. These are found in the skin or in the pulp according to the varieties. Mention can be made of 4-mercaptopentan-2-one (4MMP), 3-mercaptohexyl acetate (A3MH) and 3-mercaptohexan-1-ol (3MH) which is always present in the wines of the sauvignon blanc variety. There are many other aromatic substances such as vanillin with the odour of vanilla, fatty acids with negative herbaceous odours, sulphur derivatives (mercaptans) and those coming from wood (phenols and furans).

Among the families of chemical components mentioned hereinabove, terpenes are a family of components present in many varieties of plants of which they are often the odoriferous constituents, and of which it has been known for a long time how to extract them in the form of essential oils.

Many terpene compounds are used in perfumery or in various other industries, as food additives, perfumery and aromatherapy. Some of them even have medicinal properties and assist in fighting, for example, bacteria, mushrooms and environmental stress.

Terpene hydrocarbons have for raw formulas $C_{10}H_{16}$ (monoterpenes), which can be acyclic, monocyclic and bicyclic, $C_{15}H_{24}$ (sesquiterpenes), which can be acyclic, monocyclic, bicyclic and tricyclic, $C_{20}H_{32}$ (diterpenes), $C_{30}H_{48}$ (triterpenes), or $C_{40}H_{64}$ (tetraterpenes) and polyterpenes. Most of these compounds stereoisomers, either due to the presence of asymmetric carbons, or due to the existence of two configurations (Z and E) for certain double bonds. Frequently, in nature, only one determined stereoisomer is found and, in particular, the form of these compounds is optically active.

The oxygenated terpene compounds, in a broader acceptance including for example alcohol, ketone, aldehyde, oxides, ether functions, have carbon chains that are similar to those of the acyclic or cyclic hydrocarbons, but are sometimes less unsaturated than the corresponding hydrocarbons.

The terpenes are for example constituent elements of essential oils which are obtained by conventional extraction methods, such as distillation, enfleurage, and extraction via volatile solvents.

Mention can be made as examples of terpenes that have odorous properties:
- limonene (monocyclic monoterpene): citrus odour;
- α, β-pinene (bicyclic monoterpenes): pine odour;
- myrcene (acyclic monoterpene): odour close to that of clove;
- farnesene (acyclic sesquiterpene): green apple odour;

In light of the known odoriferous properties of these terpenes, the Applicant has found, during much research, that it could be judicious to incorporate terpenes, advantageously coming from natural essential oils, to an effervescent wine, even certain specific families and sub-families of the latter, so as to provide said wine with specific, pleasant and improved odorous and gustative properties, while still not altering the gustative quality of the effervescent wine as such, according to predetermined proportions, in order to not generate any toxicity whatsoever when consumed.

The invention therefore relates to an effervescent wine obtained according to a vinification of the traditional type, comprising a mixture of at least 20 terpenes added to said wine, wherein the terpenes are chosen from monoterpenes, in a quantity within the range of 50% by weight to 75% by weight, sesquiterpenes, in a quantity within the range of 25% by weight to 50% by weight, the sum being equal to 100% by weight, the quantity in said mixture of terpenes in the wine being between 0.02 ml and 0.6 ml per litre of effervescent wine.

The Applicant has therefore developed an original formula of terpenes, which incorporate into an effervescent wine, or sparkling wine, provides the wine with particular odorous, aromatised and gustative properties, without denaturing the taste of the varieties that it is comprised of.

Without being bound to any theory whatsoever, the Applicant found that this specific mixture of families of terpenes, the family of monoterpenes and the family of sesquiterpenes, in predetermined concentrations in the wine, made it possible to prepare aromatised effervescent wines that have properties that are appreciated by consumers, and this all the more so that interaction synergies between said terpenes and the various constituents of the wines could in part explain these properties. Moreover, the interaction between the monoterpenes and the sesquiterpenes of the invention, which can generate compounds of the family of terpenoids, can furthermore explain the improvement in the odorous and gustative properties. It is of course understood that the terpenes added to the wine, other than those which are already naturally present in effervescent wine, are chosen in such a way that they provide the wine with these desired properties, without necessarily seeking any therapeutic virtues and without having a harmful action on humans. In other words, the terpenes of the invention, as well as their added quantities, are compatible for reasonable consumption, without abuse of the effervescent wine of the invention.

Other than the gustative effects mentioned hereinabove, the volume (or weight) of the mixture of terpenes added allows for a complete dissolution of the mixture without therefore providing a cloudy aspect, for example of the emulsion type, or biphasic to the wine. This is also one of the advantages of the invention.

Each terpene can be obtained in several non-limiting ways: either by a distillation of an essential oil, or by a method of fractioning of essential oils, available off the shelf, known in the prior art. The mixture of said terpenes is conventionally carried out by analysis of said terpenes present in essential oils in order to determine the selected quantities therein, in order to prepare said mixture. Each essential oil contains a certain content in terpenes that is selected for the incorporation into the effervescent wine. Mention can be made of the following essential oils for the obtaining of single and pure monoterpenes, or in a mixture: Angelic archangelic, Provence Cyprus, Black spruce, common Juniper, Noble Bay, Mastic tree, Niaouli, compact Oregano, Scots pine, Winter savory, Tea-tree. Another example is an essential oil of hemp comprising myrcene, terpinolene, β-caryophyllene and trans-β-ocimene, each one able to be isolated pure or practically pure from this oil by the separation techniques indicated hereinabove.

Advantageously, each terpene in the mixture is of a purity≥95%, better yet≥98%, in particular ≥99%.

The expressions "% by weight" refer to percentages by relative weight in relation to the total weight of the mixture of terpenes. By way of a non-limiting example, 1 g of the mixture of terpenes comprises from 0.5 g to 0.75 g of monoterpenes, and from 0.25 g to 0.50 g of sesquiterpenes, with the sum being 1 g.

Advantageously according to the invention, the mixture of terpenes to be added to the sparkling wine is prepared in such a way as to be adapted to industrial production. The mixture can be produced according to units such as the gram or the kilogramme. For example, 100 g of mixture can include between 65 g and 70 g of monoterpenes and from 30 g to 35 g of sesquiterpenes.

The terpenes can be used in a flavouring: alone, pure or in a mixture of other compounds that provide olfactory and odorous properties that are compatible with being consumed.

The effervescent wine procures gustative and aromatic sensations that are highly appreciated when the mixture advantageously comprises from 25 to 220 terpenes, more preferably from 25 to 150, and even better from 30 to 100 terpenes. It can thus be judicious to incorporate a substantial number of different terpenes that procure a wealth and a diversity of scents and tastes to the effervescent wine.

Advantageously, the terpenes, in the mixture, include monoterpenes chosen from the sub-families of acyclic monoterpenes, of monocyclic monoterpenes, of bicyclic monoterpenes, of acyclic monoterpene alcohols, of monocyclic monoterpene alcohols, of bicyclic monoterpene alcohols, of ether-cyclic monoterpenes and of monoterpene ketones. The sub-families of sesquiterpenes are advantageously chosen from monocyclic sesquiterpenes, bicyclic sesquiterpenes, acyclic sesquiterpene alcohols and monocyclic sesquiterpene alcohols, or the mixtures thereof.

According to preferred embodiments, the monoterpenes can further comprise monoterpene oxides, and the sesquiterpenes can further include acyclic sesquiterpenes, tricyclic sesquiterpenes, bicyclic sesquiterpene alcohols, tricyclic sesquiterpene alcohols, sesquiterpene oxides or sesquiterpene ethers, or the mixtures thereof.

Generally, the expression "the monoterpenes are added in a quantity within the range from x % by weight to y % by weight, the sesquiterpenes being added in a quantity within the range from a % by weight to b % by weight" also means that the mixture of terpenes added to the wine comprises monoterpenes in a quantity of x % by weight to y % by weight and a % by weight to b % by weight of sesquiterpenes, with the sum being 100%.

Advantageously, the monoterpenes are added in a quantity within the range from 55% by weight to 75% by weight, the sesquiterpenes being added in a quantity within the range from 30% by weight to 50% by weight, more advantageously from 30% by weight to 45% by weight, the sum being equal to 100% by weight.

According to particular embodiments, the monoterpenes are added in a quantity within the range from 65% by weight to 75% by weight, the sequiterpenes being added in a quantity ranging from 25% by weight to 35% by weight, the sum being equal to 100% by weight.

According to other particular embodiments, the monoterpenes are added in a quantity within the range from 50% by weight to 55% by weight, with the sequiterpenes being added in quantities ranging from 45% by weight to 50% by weight, the sum being equal to 100% by weight.

According to other embodiments, ranges of percentages by weight of monoterpenes and sesquiterpenes can be any combination of those defined hereinabove.

The Applicant has found that, through gustative tests of aromatised effervescent wines, conducted with persons from its company, that the gustative and aromatic sensations of the wine are clearly appreciable when the mixture of terpenes typically contains a relative majority percentage (greater than 50%) in acyclic, monocyclic, bicylic monoterpenes and in acyclic monoterpene alcohols in relation to the rest of the monoterpenes, all things being moreover equal; the same applies for monocyclic, bicyclic sesquiterpenes, and acyclic and monocyclic sesquiterpene alcohols, in relation to the rest of the sesquiterpenes. The terms relative percentage means the quantity of compounds of the same sub-family in relation to the total of the compounds that represent the family present in the mixture of terpenes.

More particularly, according to embodiments, in the mixture of terpenes, the relative percentage of the acyclic monoterpenes can vary from 11% to 13%; the relative percentage of the monocyclic monoterpenes can vary from 12% to 25%, more preferably from 15% to 25%, the relative percentage of the bicyclic monoterpenes can vary from 17% to 25%; the relative percentage of the acyclic monoterpene alcohols can vary from 14% to 25%, more preferably from 17% to 25%; the relative percentage of the monocyclic monoterpene alcohols can vary from 6% to 9%; the relative percentage of the bicyclic monoterpene alcohols can vary from 6% to 9%; the relative percentage of the ether-cyclic monoterpenes can vary from 3% to 6%; the relative percentage of the monoterpene oxides can vary from 0% to 9%, with the sum of the relative percentages being 100%.

Likewise, the relative percentage of the acyclic sesquiterpenes can vary from 0% to 6%, the relative percentage of the monocyclic sesquiterpenes can vary from 18% to 22%, the relative percentage of the bicyclic sesquiterpenes can vary from 20% to 45%, more preferably from 25% to 43%, the relative percentage of the tricyclic sesquiterpenes can vary from 0% to 10%, the relative percentage of the acyclic sesquiterpene alcohols can vary from 20% to 40%, more preferably from 25% to 35%; the relative percentage of the monocyclic sesquiterpene alcohols can vary from 5% to 20%, the relative percentage of the bicyclic sesquiterpene alcohols can vary from 0% to 3%; the relative percentage of the sesquiterpene oxides can vary from 0% to 6%, the relative percentage of the sesquiterpene ethers can vary from 0% to 3%, with the sum of the relative percentages being 100%.

In order to present an effervescent wine with the terpenes of the invention, with the desired properties, the quantity of said mixture of terpenes in the wine can be between 0.03 ml and 0.40 ml per litre of effervescent wine, more preferably between 0.04 ml and 0.15 ml per litre of effervescent wine.

It is very advantageous to choose the specific terpenes from the following non-limiting list.

Acyclic monoterpenes: β-myrcene, a and β-ocimenes;

Monocyclic monoterpenes: terpinolene, α and γ-terpinenes, p-menthene, p-cymene, D-limonene, α-phellandrene;

Bicyclic monoterpenes: α and β-pinenes, α-tuyene, camphene, 3-carene, (R)(+)-sabinene and (S)(−)-sabinene, hashishene.

Acyclic monoterpene alcohols: geraniol, nerol (cis-geraniol), citronellol, ipsdienol and linalool;

Monocyclic monoterpene alcohols: α-terpineol, terpinene-4-ol, piperidol;

Bicyclic monoterpene alcohols: α-fenchol and borneol and 4-thujanol;

Ether-cyclic monoterpenes: eucalyptol;

Ketone monoterpenes: camphor and fenchone;

Monoterpene oxides: α and β-ocimene oxides and terpinolene oxide;

Acylic sesquiterpenes: α-farnesene, trans-β-farnesene;

Monocyclic sesquiterpenes: α and γ-elemenes, α-humulene, β-curcumene, β-bisabolene, β-sesquiphellandrene and germacrene;

Bicyclic sesquiterpenes: α-bergamotene, α-bulnesene, α-santalene, α-selinene, γ-selinene, guaiadiene, β-caryophyllene, calamenene, Δ-cardinene, γ-muurolene, γ-cardinene, isocaryophyllene, valencene, α-guaiene, selina-4,11-diene;

Tricyclic sesquiterpenes: α-copaene, α-ylangene, aromadendrene and β-cedrene;

Acyclic sesquiterpene alcohols: nerolidol, farnesol;

Monocyclic sesquiterpene alcohols: α-bisabolol;

Bicyclic sesquiterpene alcohols: ledol;

Tricyclic sesquiterpene alcohols: spathulenol;

Sesquiterpene oxides: eisocaryophyllene oxide and humulene oxide;

Ether sesquiterpenes: sequicineole.

It results from these various parameters: nature of the monoterpenes and sesquiterpenes, their number in the mixture, the relative proportion and their concentration/weight in the wine, that it can be made available of aromatised effervescent wines having gustative properties that are suited to the desires of the consumer. It is possible, for example, to propose an effervescent wine having a more or less pronounces taste, more marked in floral terpenes or in terpenes giving a citrus flavour etc.

The effervescent wine according to the invention can furthermore include non-terpene compounds present in the mixture to be added to the wine, in quantities more preferably between 1% by weight and 5% by weight, such as aldehydes, for example hexyl acetate, octanal, nonanal or decanal, 2-pentylfuran, known for their flavourings, or ketones, alcohols, ethers, and/or esters, compatible to be consumed by a human being. In this case, in the mixture of terpenes, the relative percentage in weight of the terpenes is such as that defined hereinabove.

In the framework of the invention, the effervescent wine is advantageously obtained by traditional vinification and thus comes from white grapes or from any grape allowing for the application of this traditional method. Any variety is suitable, such as Pinot Noir, Meunier, Chardonnay, Gamay, Aligoté, Melon, Sacy, pinotblanc, pinotgris, pinotnoir, riesling, auxerrois, without any constraint in proportions. The most widely known French effervescent wines are the wines of Champagne, blanquettedeLimoux, crémantsdeLoire, Bourgogne, Jura, Alsace and Bordeaux, or clairettedeDie. Other effervescent wines are also produced in Bugey under the name Cerdon and in Gaillacois. Spain also produces cavas. Many bubbly wines ("spumante") and sparkling ("frizzante") are also elaborated in Italy and on the west coast of the United States.

In France, there are also "quality sparkling wines produced in specified regions" (VMQPRD), these are sparkling wines that do not come from authorised regions or that do not entirely follow the decrees of the names. However, they can also provide quality products, in comparable price ranges, even more affordable due to their lesser degree of notoriety. The effervescent wine is not limited to white wines, but can be effervescent rosé, even effervescent red wine obtained according to conventional methods for these types of wines, known in prior art.

The traditional method is a method of elaboration of effervescent wines that consists in a second fermentation in bottles of a still wine after the adding of a drawing liquor. The traditional method of elaboration of an effervescent wine is identical to the champenoise method for the elaboration of champagne.

The steps of the vinification of an effervescent wine in the traditional method are typically as follows:

1) Vinification of still wines. After the harvest, the grapes are vinified separately variety by variety into white wines. This first fermentation is done in a tank. The wines obtained are said to be still wines (non-effervescent).
2) Elaboration of the cuvée. The still wines are then assembled in tanks. The assemblage of still wines is called elaboration of the cuvée. The cuvée is the assembly of different still wines coming from different varieties and from different plots.
3) The drawing. A drawing liquor (solution of cane sugar, typically from 20 to 24 g/l, and of yeast) is added to the cuvée before bottling. The wine is drawn from the tanks, it is put into bottles with a cork. The bottles are placed on racks.
4) A second fermentation is done in bottles. In its glass housing, under the action of yeasts, the sugar added by the drawing liquor is transformed into alcohol with production of carbon dioxide which dissolves in the wine and will give the frith and the bubbles: this is the creation of foam. The bottles remain on racks for a variable length of time according to the regulations in effect of the name, so that the wine is nourished with the fermentation lees.
5) The dosage. The yeasts are transformed, release flavourings and leave a deposit. An operation of riddling of the bottles brings the deposit in the neck of the bottle under the cork. The bottle is disgorged (the yeast deposit is thus removed), then an expedition liqueur (mixture of old wine and cane sugar) is added in order to complete the volume of the removed deposit: this is dosage. According to the percentage of sugar contained in the expedition liqueur, a dry, semi-dry or sweet effervescent wine will be obtained.

The effervescent wine is advantageously obtained by vinification of the traditional type. The Applicant has thus adapted this method of vinification for the incorporation of the mixture of terpenes according to the invention, because it is one of the methods of vinification that prevents making the effervescent wine cloudy or that prevents the presence of several phases via the non-dissolution of terpenes in the effervescent wine and which offers, finally, the best guarantee of stability and of homogeneity in the distribution of the mixture of terpenes in said wine.

Consequently, another aspect of the invention is a traditional method of vinification of an effervescent wine comprising the following steps of vinification of grapes into still wines, of elaborating the cuvée, of adding a drawing liquor, of a second fermentation, of riddling and disgorging, characterised in that it comprises, after the step of disgorging, a step of adding an expedition liqueur comprising the mixture of terpenes of the invention.

Preferably, the expedition liqueur comprises a predetermined quantity of sugar, typically between 9 and 12 g, a dose of wine and the mixture of terpenes according to the invention, in such a way that the quantity in said mixture of terpenes in the wine is between 0.02 ml and 0.6 ml per litre of effervescent wine.

The expedition liqueur before the adding thereof into bottles is shaken then filtered in order to ensure that the final effervescent wine is not cloudy.

The invention also relates to a use of a mixture of at least 20 terpenes wherein the terpenes are chosen from monoterpenes, in a quantity within the range of 50% by weight to 75% by weight, sesquiterpenes, in a quantity within the range of 25% by weight to 50% by weight, the sum being equal to 100% by weight, for the manufacture of an effervescent wine obtained by traditional vinification, the quantity in said mixture of terpenes in said wine being between 0.02 ml and 0.6 ml per litre of effervescent wine.

The other alternatives in concentrations and in proportions of terpenes, such as described hereinabove, also apply here. The terpenes come more preferably from essential oils, such as described hereinabove.

Other methods of preparation of effervescent wines and of adding of the mixture of terpenes according to the invention in effervescent wine can be used, known in the prior art, such as those that follow. They are implemented by conventional devices that are widely known to those skilled in the art.

The Charmat method (method of fermentation in a closed tank): the Charmat method of the second fermentation transforms in a tank a still wine into an effervescent wine. This method makes use of the same principles as the champenoise or traditional method with however a significant difference: the creation of the froth takes place in a tank under high pressure, not in a bottle, which allows for the final clarification of the bulk wine. At the beginning, the base wines, or still wines, are mixed in large stainless steel tanks, called autoclaves, with yeasts and with a fermentation liquor. It is at this moment that the mixture of terpenes of the invention is added. The fermentation is strictly controlled and lasts a minimum of three weeks, until the pressure reaches a threshold of 5 bars similar to champagne. It is then stopped by cooling, typically to temperatures between −1° C. and −5° C. The fermentation is complete. As the tank is closed, the carbon dioxide produced during this second fermentation was not able to escape. The effervescent wine is then filtered then transferred into drawing tanks where it is stored until bottling. The filtering is required in order to remove the particles in suspension coming from the fermentation, such as the yeasts.

The method of adding $CO_2$ or gasification. The carbon dioxide is supplied continuously in the wine stream stabilised and refrigerated beforehand, for example at −2° C., containing the mixture of terpenes of the invention. Said wine, more preferably white wine or any other wine that makes it possible to obtain effervescent wine, is obtained according to conventional methods of vinification. The process takes place typically continuously. The carbon dioxide comes for example from a reserve tank containing gas under high pressure. It is expanded and introduced proportionately in the wine in a device of the saturator type. An element made of sintered metal with a very fine porosity, more preferably a capsule, makes it possible to divide the gas very finely. The gas dissolves instantly and for the most part in the wines. The excess gas is compressed and will give the effervescence when the bottle is opened. At the output of the device of the saturator type, the wine is immediately bottled in particular thanks to an isobarometric filler.

The closed tank method: the wine, more preferably white wine or any other wine that makes it possible to obtain effervescent wine, obtained according to conventional methods of vinification, with the addition of sugar, yeasts and of the mixture of terpenes of the invention is maintained at an ambient temperature, for example from 15° C. to 25° C. The creation of froth does not typically last longer than 10 days. As soon as the creation of froth is complete, the wine which has become sparkling is refrigerated typically at temperatures between −1° C. and −5° C., in order to stabilise it and limit the effervescence; then it is filtered at low temperature, pout back into a buffer tank with its carbon dioxide, the bottled in particular thanks to an isobarometric The nanoemulsion method: typically thanks to a homogenizer at high pressure, the mixture of terpenes us reduced to a nanometric size and is therefore perfectly miscible in the alcohol, which leads to a stable emulsion of said mixture of terpenes in effervescent wine.

EXAMPLES OF PRODUCTION

Example 1

FIG. 1 shows a chromatogram obtained via gas chromatography combined with a analyse via mass spectrometry of a sample of sparkling wine with a base of Chardonnay varieties, obtained by a traditional vinification developed hereinabove, containing a mixture of at least 20 terpenes.

The extraction of terpenes, is carried out via SPME (Solid Phase Microextraction) DVB/CAR/PDMS grey fibre. They are then desorbed in the injector and subjected to gas chromatography analysis on an AGILENT HP-5MS column, coupled to a mass spectrometry detector (SIM/SCAN mode). (Electronic impact, Trace/Detector mode: 500 V/Emission current: 100 µA/Source temperature: 200° C.). The chromatography peaks observed are compared to the NIST spectral database.

Results

The chromatogram of FIG. 1 identifies only the peaks for which the mass spectrum allows for an identification of the molecules with a recognition percentage greater than 50% in the NIST database.
Identified Compounds
Linalol
Camphor
Terpineol Isomers
Nerol oxide
Isoborneol
Borneol
Carvo menthol
Nerol
Citronellol
Geraniol
Beta Ionone
Caryophyllene
Muurolene
Alpha Himachalene
Alpha Pinene
Sabinene
Beta Myrcene
D limonene
Eucalyptol,
Terpinolene, and
Fenchol.

All these said identified compounds are individually included in the definition of terpenes of the invention.

Example 2

Table 1 represents an example of a mixture of 35 terpenes according to the invention.

| Product | Weight (g) | Family |
|---|---|---|
| 1-4 Cineol | 0.001 | Monoterpene |
| Decanal | 0.110 | Aldehyde |
| Aldehyde in C8 | 0.073 | Aldehyde |
| Allo-aromadendrene | 0.011 | Sesquiterpene |
| Camphene | 0.001 | Monoterpene |
| Carveol | 0.194 | Monoterpene |
| Carvone Laevo | 0.100 | Monoterpene |
| 1,8-Cineole | 0.020 | Monoterpene |
| E-β-ocimene | 0.065 | Monoterpene |
| Fenchol | 3.828 | Monoterpene |
| Gamma Terpineol | 0.730 | Monoterpene |
| Geraniol | 0.220 | Monoterpene |
| Geranyl acetate | 1.650 | Monoterpene |
| 1,2-humulene epoxide | 0.005 | Sesquiterpene |
| Limonene | 10.77 | Monoterpene |
| Linalol | 6.900 | Monoterpene |
| Myrcene | 34.52 | Monoterpene |
| Nerolidol | 5.720 | Sesquiterpene |
| Nonanal | 0.001 | Aldehyde |
| Caryophyllene oxide | 0.023 | Sesquiterpene |
| Limonene oxide | 0.242 | Monoterpene |
| Paracymene | 0.002 | Monoterpene |
| Sabinene | 0.121 | Monoterpene |
| Terpinen-4-ol | 0.044 | Monoterpene |
| Terpinolene | 3.860 | Monoterpene |
| Z-β-farnesene | 0.032 | Monoterpene |
| Z-β-ocimene | 0.001 | Monoterpene |
| α-caryophyllene | 0.013 | Sesquiterpene |
| α-terpineol | 2.728 | Monoterpene |
| α-humulene | 0.087 | Sesquiterpene |
| α-pinene | 0.300 | Monoterpene |
| α-selinene | 0.012 | Sesquiterpene |
| α-terpinene | 0.001 | Monoterpene |
| α-trans-bergamotene | 0.021 | Sesquiterpene |
| β-caryophyllene | 24.20 | Sesquiterpene |
| β-pinene | 2.777 | Monoterpene |
| β-terpineol | 0.616 | Monoterpene |
| γ-terpinene | 0.002 | Monoterpene |
| Total weight: | 100.00 g | |

0.5 ml of this mixture is then sampled which is added to a sparkling wine, for example during a step of vinification, such as described hereinabove. The terpenes mentioned in Table 1 are individually part of the terpene compounds of the invention.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

The invention claimed is:

1. Effervescent wine, comprising a mixture of at least 20 terpenes added to said effervescent wine, wherein the terpenes are chosen from monoterpenes, in a quantity within the range of 50% by weight to 75% by weight of the terpenes, and sesquiterpenes, in a quantity within the range of 25% by weight to 50% by weight of the terpenes, the sum of the quantity of the monoterpenes and the quantity of the sesquiterpenes being equal to 100% by weight of the terpenes, and the quantity in said mixture of terpenes in the effervescent wine being between 0.02 ml and 0.6 ml per litre of effervescent wine.

2. Effervescent wine according to claim 1, wherein
the monoterpenes in the mixture comprise one or more monoterpenes chosen from the sub-families of acyclic monoterpenes, monocyclic monoterpenes, bicyclic monoterpenes, acyclic monoterpene alcohols, monocyclic monoterpene alcohols, bicyclic monoterpene alcohols, ether-cyclic monoterpenes, and monoterpene ketones, and
the of sesquiterpenes in the mixture comprise one or more sesquiterpenes chosen from the sub-families of monocyclic sesquiterpenes, bicyclic sesquiterpenes, acyclic sesquiterpene alcohols, and monocyclic sesquiterpene alcohols.

3. Effervescent wine according to claim 1, wherein
the monoterpenes comprise monoterpene oxides, and
the sesquiterpenes comprise one or more sesquiterpenes selected from acyclic sesquiterpenes, tricyclic sesquiterpenes, bicyclic sesquiterpene alcohols, tricyclic sesquiterpene alcohols, sesquiterpene oxides and sesquiterpene ethers.

4. Effervescent wine according to claim 1, wherein the quantity of the monoterpenes is within the range from 55% by weight to 75% by weight of the terpenes, and the quantity of the sesquiterpenes is within the range from 30% by weight to 50% by weight of the terpenes, with the sum of the quantity of the monoterpenes and the quantity of the sesquiterpenes being equal to 100% by weight of the terpenes.

5. Effervescent wine according to claim 1, wherein the quantity of the monoterpenes is within the range from 65% by weight to 75% by weight of the terpenes, and the quantity of the sesquiterpenes is within the range from 25% by weight to 35% by weight of the terpenes, with the sum of the quantity of the monoterpenes and the quantity of the sesquiterpenes being equal to 100% by weight of the terpenes.

6. Effervescent wine according to claim 1, wherein the quantity of the monoterpenes is within the range from 50% by weight to 55% by weight of the terpenes, and the quantity of the sesquiterpenes is within the range from 45% by weight to 50% by weight of the terpenes, with the sum of the quantity of the monoterpenes and the quantity of the sesquiterpenes being equal to 100% by weight of the terpenes.

7. Effervescent wine according to claim 1, wherein in the mixture of terpenes, a relative percentage of acyclic monoterpenes varies from 11% to 13%; a relative percentage of monocyclic monoterpenes varies from 12% to 25%, a relative percentage of bicyclic monoterpenes varies from 17% to 25%; a relative percentage of acyclic monoterpene alcohols varies from 14% to 25%; a relative percentage of monocyclic monoterpene alcohols varies from 6% to 9%; a relative percentage of bicyclic monoterpene alcohols varies from 6% to 9%; a relative percentage of ether-cyclic monoterpenes varies from 3% to 6%; and a relative percentage of monoterpene oxides varies from 0% to 9%, with the sum of the relative percentages being 100% of the monoterpenes in the mixture.

8. Effervescent wine according to claim 1, wherein, in the mixture of terpenes, a relative percentage of acyclic sesquiterpenes varies from 0% to 6%, a relative percentage of monocyclic sesquiterpenes varies from 18% to 22%, a relative percentage of bicyclic sesquiterpenes varies from 20% to 45%, a relative percentage of tricyclic sesquiterpenes varies from 0% to 10%, a relative percentage of acyclic sesquiterpene alcohols varies from 20% to 40%; a relative percentage of monocyclic sesquiterpene alcohols varies from 5% to 20%, a relative percentage of bicyclic sesquiterpene alcohols varies from 0% to 3%; a relative percentage of sesquiterpene oxides varies from 0% to 6%, and a relative percentage of sesquiterpene ethers varies from 0% to 3%, with the sum of the relative percentages being 100% of the sesquiterpenes in the mixture.

9. Effervescent wine according to claim 1, wherein, the quantity in said mixture of terpenes in the effervescent wine is between 0.03 ml and 0.40 ml per litre of effervescent wine.

10. Effervescent wine according to claim 9, wherein the quantity in said mixture of terpenes in the effervescent wine is between 0.04 ml and 0.15 ml per litre of effervescent wine.

11. A method, comprising:
vinifying grapes into to still wines, the vinifying comprising a first fermentation process;
elaborating a cuvée, the elaborating of the cuvée comprising assembling the still wines in a tank to form the cuvée;
adding a drawing, liquor to the cuvée to form a blended wine comprising the drawing liquor;
drawing the blended wine from the tank and adding the blended wine to a bottle,
causing a second fermentation process to be performed on the blended wine in the bottle to cause bubbles to form in the blended wine;
riddling and disgorging the bottle; and
adding an expedition liqueur to the blended wine in the bottle after the disgorging to form an effervescent wine comprising a mixture of terpenes,
wherein the expedition liqueur includes a mixture of terpenes comprising at least 20 terpenes chosen from monoterpenes, in a quantity within the range of 50% by weight to 75% by weight of the terpenes, and sesquiterpenes, in a quantity within the range of 25% by weight to 50% by weight of the terpenes, the sum of the quantity of the monoterpenes and the quantity of the sesquiterpenes being equal to 100% by weight of the terpenes, and the quantity in said mixture of terpenes in the effervescent wine being between 0.02 ml and 0.6 ml per litre of effervescent wine.

12. A method, comprising:
adding a mixture of at least 20 terpenes to an effervescent wine, wherein
the terpenes are chosen from monoterpenes, in a quantity within the range of 50% by weight to 75% by weight of the terpenes, and sesquiterpenes, in a quantity within the range of 25% by weight to 50% by weight of the terpenes, the sum of the quantity of the monoterpenes and the quantity of the sesquiterpenes being equal to 100% by weight of the terpenes, and
the mixture of terpenes is added to said effervescent wine in an amount between 0.02 ml and 0.6 ml per litre of the effervescent wine.

* * * * *